(12) United States Patent
Jung et al.

(10) Patent No.: US 11,315,738 B2
(45) Date of Patent: Apr. 26, 2022

(54) TANTALUM CAPACITOR AND MANUFACTURING METHOD THEREOF

(71) Applicant: SAMSUNG ELECTRO-MECHANICS CO., LTD., Suwon-si (KR)

(72) Inventors: Hun Chol Jung, Suwon-si (KR); Wan Suk Yang, Suwon-si (KR); Yeong Su Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1 day.

(21) Appl. No.: 16/876,343

(22) Filed: May 18, 2020

(65) Prior Publication Data

US 2021/0183585 A1    Jun. 17, 2021

(30) Foreign Application Priority Data

Dec. 12, 2019    (KR) .................. 10-2019-0165449

(51) Int. Cl.
| | |
|---|---|
| *H01G 9/012* | (2006.01) |
| *H01G 9/00* | (2006.01) |
| *H01G 9/15* | (2006.01) |
| *H01G 9/042* | (2006.01) |
| *H01G 9/008* | (2006.01) |

(52) U.S. Cl.
CPC .......... *H01G 9/012* (2013.01); *H01G 9/0029* (2013.01); *H01G 9/15* (2013.01); *H01G 9/008* (2013.01); *H01G 9/042* (2013.01)

(58) Field of Classification Search
CPC ............. H01G 9/08; H01G 9/15; H01G 9/012
See application file for complete search history.

(56) References Cited

U.S. PATENT DOCUMENTS

| 7,161,797 B2* | 1/2007 | Vaisman ................ | H01G 2/065 361/540 |
| 8,000,086 B2* | 8/2011 | Okada ................... | H01G 9/012 361/540 |

(Continued)

FOREIGN PATENT DOCUMENTS

| JP | 2001-110676 A | 4/2001 | |
| JP | 2001102252 A * | 4/2001 | ............. H01G 4/236 |

(Continued)

*Primary Examiner* — Eric W Thomas
(74) *Attorney, Agent, or Firm* — Morgan, Lewis & Bockius LLP (57) ABSTRACT

A tantalum capacitor includes: a tantalum body having a tantalum wire exposed from one surface of the tantalum body; a molded portion including first and second surfaces opposing in a thickness direction, third and fourth surfaces opposing in a width direction, and fifth and sixth surfaces opposing in a longitudinal direction, the molded portion surrounding the tantalum body; an anode lead frame including an anode connection member and an anode terminal, which are connected to the tantalum wire, exposed through the second surface of the molded portion; and a cathode lead frame spaced apart from the anode lead frame, and exposed through the second surface of the molded portion, wherein end portions of the tantalum wire, the anode connection member, and the anode terminal in the longitudinal direction are on a same plane.

18 Claims, 7 Drawing Sheets

(56) References Cited

U.S. PATENT DOCUMENTS

| | | | |
|---|---|---|---|
| 2004/0145065 A1 | 7/2004 | Sano et al. | |
| 2005/0105248 A1* | 5/2005 | Oh | H01G 2/065 |
| | | | 361/523 |
| 2005/0146842 A1* | 7/2005 | Abe | H01G 9/012 |
| | | | 361/523 |
| 2009/0237866 A1* | 9/2009 | Okada | H01G 9/012 |
| | | | 361/528 |
| 2011/0032662 A1* | 2/2011 | Ihara | H01G 9/0029 |
| | | | 361/540 |
| 2016/0133391 A1* | 5/2016 | Navratil | H01G 9/15 |
| | | | 361/528 |
| 2017/0271087 A1* | 9/2017 | Aoyama | H01G 9/052 |

FOREIGN PATENT DOCUMENTS

| | | | |
|---|---|---|---|
| JP | 2003-197486 A | | 7/2003 |
| JP | 2004-228424 A | | 8/2004 |
| JP | 2006059855 A | * | 3/2006 |

* cited by examiner

TANTALUM CAPACITOR AND MANUFACTURING METHOD THEREOF

CROSS-REFERENCE TO RELATED APPLICATION

The present application claims the benefit of priority to Korean Patent Application No. 10-2019-0165449, filed on Dec. 12, 2019 with the Korean Intellectual Property Office, the entire disclosure of which is incorporated herein by reference.

TECHNICAL FIELD

The present disclosure relates to a tantalum capacitor and a manufacturing method thereof.

BACKGROUND

A tantalum (Ta) material is a metal having mechanical or physical characteristics such as a high melting point, excellent ductility and excellent corrosion-resistance, and is widely used in various fields throughout industries such as the electrical, electronic, mechanical, chemical, aerospace, and defense industries. Since the tantalum material may form a stable anodic oxide film, tantalum has been widely used as a material in forming anodes for small capacitors. Recently, in accordance with the rapid development of information technology (IT) industries, such as electronics information and communications technology (ICT) and electronics technology, tantalum has been increasingly used on a year-on-year basis.

Conventional tantalum capacitors use a structure in which a terminal is extracted externally by using a structure using an internal lead frame or a structure using without an internal lead frame or frame, in order to connect the tantalum material and the electrode.

In this case, in the case of a structure using an internal lead frame, a space occupied by tantalum material in the molded portion may be reduced by a lead frame constituting an anode and a cathode, and since capacitance is proportional to a volume of the tantalum material, there may be a problem with a limitation of the capacitance. In the case of a structure in which a terminal is extracted externally without a frame, there has been a problem in that ESR of the capacitor increases because contact resistance by a plurality of contact materials increases as a number of contact materials exist.

In addition, in the case of a structure in which a terminal is extracted externally without a conventional frame, since an internal volume fraction of the tantalum material is reduced because a welding distance for welding an anode wire and an anode lead frame should be necessarily secured, there is a problem in which the capacitance decreases.

SUMMARY

An aspect of the present disclosure is to provide a tantalum capacitor capable of realizing high capacity.

Another aspect of the present disclosure is to provide a tantalum capacitor having excellent reliability by improving mechanical strength.

Another aspect of the present disclosure is to provide a tantalum capacitor by improving a breakdown voltage (BDV) by increasing a withstand voltage.

According to an aspect of the present disclosure, a tantalum capacitor includes: a tantalum body having a tantalum wire exposed from one surface; a molded portion including first and second surfaces opposing each other in a thickness direction, third and fourth surfaces opposing each other in a width direction, and fifth and sixth surfaces opposing each other in a longitudinal direction, the molded portion surrounding the tantalum body; an anode lead frame including an anode connection member and an anode terminal, which are connected to the tantalum wire, exposed through the second surface of the molded portion; and a cathode lead frame spaced apart from the anode lead frame, and exposed through the second surface of the molded portion. End portions of the tantalum wire, the anode connection member, and the anode terminal in the longitudinal direction may be on a same plane.

According to another embodiment of the present disclosure, a manufacturing method of a tantalum capacitor include operations of: mounting a tantalum capacitor including a tantalum body in which a tantalum wire is exposed from one surface on an anode lead frame including an anode terminal and an anode connection member and a cathode lead frame; and cutting the anode terminal, the anode connection member, and the tantalum wire.

According to still another embodiment of the present disclosure, a tantalum capacitor includes: a tantalum body having a tantalum wire exposed from one surface; a molded portion including first and second surfaces opposing each other in a thickness direction, third and fourth surfaces opposing each other in a width direction, and fifth and sixth surfaces opposing each other in a longitudinal direction, the molded portion surrounding the tantalum body; an anode lead frame including an anode connection member and an anode terminal, which are connected to the tantalum wire, exposed through the second surface of the molded portion; and a cathode lead frame spaced apart from the anode lead frame, and exposed through the second surface of the molded portion. The tantalum wire, the anode connection member, and the anode terminal are exposed to an outside of the tantalum capacitor through the fifth surface of the tantalum body in the longitudinal direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction or a longitudinal direction, a Y direction as a second direction, a W direction or a width direction, and a Z direction as a third direction, a T direction, or a thickness direction.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

Figure 1:
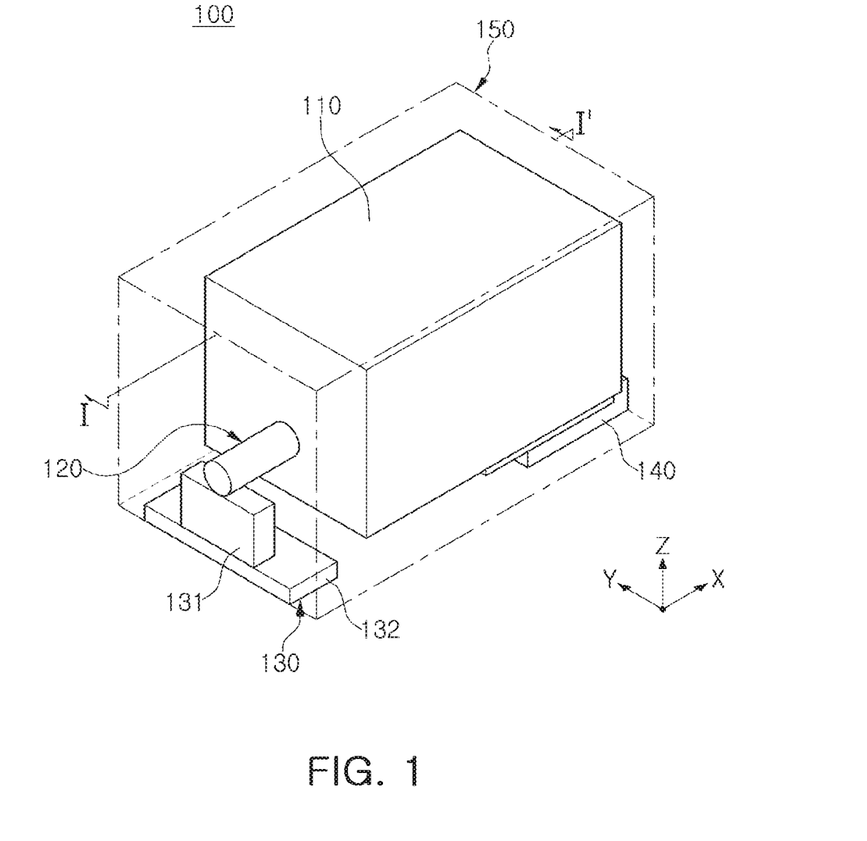
FIGS. 1 and 2 are perspective views illustrating a tantalum capacitor according to an exemplary embodiment of the present disclosure.
Figure 2:
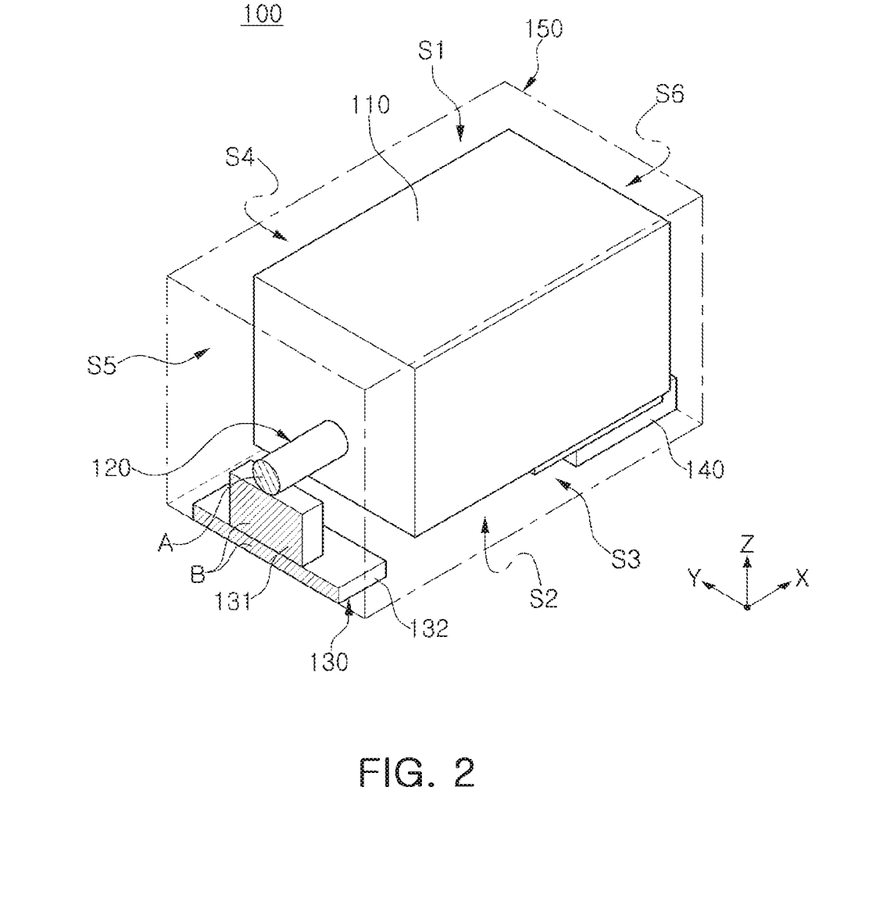
Figure 3:
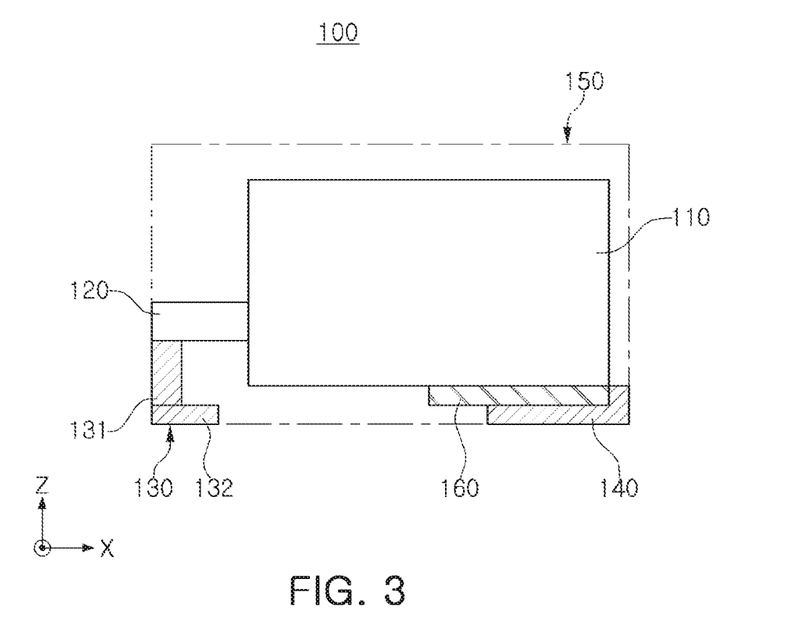
FIGS. 3 and 4 are side views of FIGS. 1 and 2.
Figure 4:
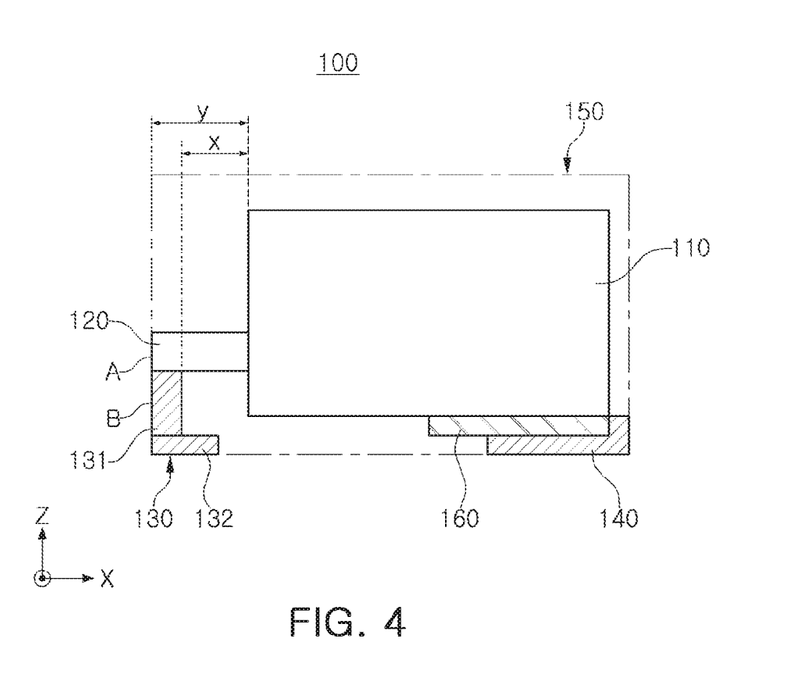

FIGS. 1 and 2 are schematic perspective views of a tantalum capacitor according to an exemplary embodiment of the present disclosure, and FIGS. 3 and 4 are side views of FIGS. 1 and 2.

Referring to FIGS. 1 to 4, a tantalum capacitor 100 includes: a tantalum body 110 having a tantalum wire 120 exposed through one end surface, a molded portion 150 including fifth and sixth surfaces S5 and S6 facing in a first direction, third and fourth surfaces S3 and S4 facing in a second direction, and first and second surfaces S1 and S2 facing in a third direction, the molded portion 150 being formed to surround the tantalum body 110; an anode lead frame 130 including an anode connection member 131 and an anode terminal 132, which are connected to the tantalum wire 120, exposed through the second surface S2 of the molded portion 150; and a cathode lead frame 140 spaced apart from the anode lead frame 130 and exposed through the second surface S2 of the molded portion 150.

In this case, an end portion of the tantalum wire 120, the anode connection member 131, and the anode terminal 132 in the first direction may be on the same plane. Referring to FIGS. 2 and 4, the tantalum wire 120 may have an end portion (A), the anode connection member 131 and the anode terminal 132 may have an end portion (B). The end portion (A) of the tantalum wire 120 and the end portion of the anode connection member 131 and the anode terminal 132 may be disposed toward the first direction (X direction) of the molded portion 150, respectively. That is, the end portion (A) of the tantalum wire 120 and the end portion (B) of the anode connection member 131 and the anode terminal 132 may face the fifth surface S5 of the molded portion 150. The end portions (A) and (B) in the first direction of the tantalum wire 120, the anode connection member 131, and the anode terminal 132 are on the same plane, which may include an error range, and the error range may be, for example, within a range of ±0.5 mm. The tantalum capacitor 100 according to the present disclosure may have a structure in which the end portion (A) of the tantalum wire 120 and the end portion (B) of the anode connection member 131 and the anode terminal 132 are disposed on the same plane, as described above, and the tantalum wire 120 can be disposed as close as possible to the fifth surface S5 of the molded portion 150, thereby increasing an effective volume of the tantalum body inside the molded portion 150. In other words, the tantalum wire 120, the anode connection member 131, and the anode terminal 132 may be exposed to an outside of the tantalum capacitor 100 through the fifth surface S5 of the tantalum body 110 in the first direction.

In one example, the end portion (A) of the tantalum wire 120 applied to the tantalum capacitor 100 of the present disclosure and the end portion (B) of the anode connection member 131 and the anode terminal 132 may be a cutting surface formed by cutting. An anode lead frame of a general tantalum capacitor is manufactured by cutting and pressing a conductive thin plate, or the like to form an electrode plate, and welding an anode connection member, or the like to an upper surface of the electrode plate. In this case, in order to perform a separate welding process, a space that is capable of welding is required. In addition, a precise process of accurately positioning the anode connection member at a specific position on the upper surface of the electrode plate may be required for welding, and short circuits may occur as a welding material, or the like, is applied, and particularly, as the tantalum capacitor is miniaturized, these problems as described above occur more frequently. Moreover, for the process of bonding the tantalum wire to the anode connection member, since the tantalum wire must satisfy the minimum required length, there was a physical limitation of increasing the volume of the tantalum body, which is a capacitance part.

The above-described problems can be solved by cutting the end portion (A) of the tantalum wire 120 and the end portion (B) of the anode connection member 131 and the anode terminal 132. When the tantalum wire 120, the anode connection member 131, and the anode terminal 132 are first bonded and then cut them to form a cutting surface, welding is not necessary through a fine position adjustment, as the manufacturing method as described later, and it is possible to provide a tantalum capacitor having a wire length shorter than a minimum required length of the wire but not causing problems such as short.

In an exemplary embodiment of the present disclosure, the anode lead frame 130 may be made of a conductive metal such as a nickel/iron alloy, and may include an anode connection member 131 and an anode terminal 132. The anode terminal 132 of the anode lead frame 130 may be exposed through the second surface S2 of the molded portion 150. The anode terminal 132 may be exposed through a lower surface of the molded portion 150 to serve as a terminal when mounted on a substrate. In this case, the anode terminal 132 may be disposed to be spaced apart from the tantalum body 110, and a space in which the anode terminal 132 and the tantalum body 110 are spaced apart may be filled with a resin component, or the like, constituting the molded portion 150 to be described later.

In an exemplary embodiment of the present disclosure, a length of the anode connection member 131 included in the anode lead frame 130 in the first direction may be 0.2 mm or less. The length of the anode connection member 131 in the first direction may be a length in the X direction, and referring to FIG. 4, it may mean a length of (y-x). The length of the anode connection member 131 in the first direction may be 0.2 mm or less, 0.19 mm or less, 0.18 mm or less, 0.17 mm or less, 0.16 mm or less, or 0.15 mm or less, a lower limit thereof is not particularly limited, and for example, it may be exceed 0 mm or exceed 0.01 mm. The length of the anode connection member 131 in the first direction of the present embodiment may be implemented by having a structure in which the end portion (A) of the tantalum wire 120 and the end portion (B) of the anode connection member 131 and the anode terminal 132 are disposed on the same plane, as described above.

Figure 5:
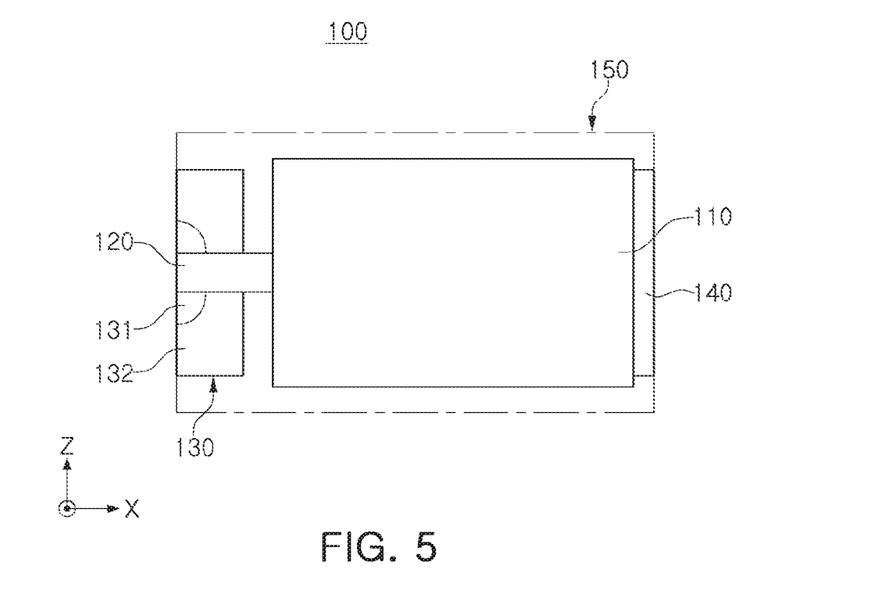
FIG. 5 is a plan view of FIG. 1 of the present disclosure.

In an exemplary embodiment of the present disclosure, the anode connection member 131 included in the anode lead frame 130 may have a square columnar shape. FIG. 5 is a cross-sectional view illustrating a tantalum capacitor according to an exemplary embodiment of the present disclosure. Referring to FIG. 5, the anode connection member 131 of the present embodiment may have a square columnar shape, but is not limited thereto. For example, in another example of the present disclosure, the anode connection member 131 included in the anode lead frame 130 may have a cylindrical shape.

In another exemplary embodiment of the present disclosure, the tantalum wire 120 and the anode connection member 131 may include a welded joint. Even if the tantalum wire 120 and the anode connection member 131 are attached by welding, the tantalum capacitor 100 according to the present disclosure may have a high mechanical strength compared to an adhesive layer, or the like, while having a high withstand voltage and breakdown voltage, by having a high body volume, and thus excellent electrical properties and mechanical reliability may be compatible. The welding may use a spot welding or a laser welding, but is not limited thereto.

In an exemplary embodiment of the present disclosure, a groove into which the tantalum wire 120 is fitted and coupled may be disposed at a portion where the anode connection member 131 is connected to the tantalum wire 120. The groove may be formed on a surface of the anode connection member 131 in the Z direction, and the tantalum wire may be fitted into and coupled to the groove. In this case, the tantalum wire and the anode connection member 131 may be U-shaped, semi-circular, V-shaped, or square, but are not limited thereto. The method for forming such a groove is not particularly limited, and may be formed, for example, by punching or cutting a portion of the anode connection member 131.

The anode lead frame 130 and the cathode lead frame 140 of the tantalum capacitor 100 according to the present disclosure may be made of a conductive metal such as a nickel/iron alloy. The anode lead frame 130 may include an anode lead connection member 131 and an anode terminal 132, and the anode lead frame 130 the anode terminal 132 may be manufactured separately and then attached by welding or the like, or they may be integrally formed.

The anode lead frame 130 and the cathode lead frame 140 of the tantalum capacitor 100 according to the present disclosure may include an anode connection portion and a cathode connection portion that are mounted on a substrate, respectively. The anode connection portion and the cathode electrode connection portion include one of a conductive material, such as chromium titanium an intermetallic compound (Cr (Ti)), copper (Cu), nickel (Ni), palladium (Pd), gold (Au), or a combination thereof, and may be formed by a sputter deposition method or a plating method, but is not limited thereto.

The tantalum body 110 of the tantalum capacitor 100 according to the present disclosure is formed by using a tantalum material, for example, may be manufactured by mixing and stirring a tantalum (Ta) powder and a binder at a certain ratio, and compressing the mixed powder into a generally cuboid form, and then sintered under high temperature and high vacuum.

In addition, the tantalum body 110 may have a tantalum wire 120 exposed in the X direction of the tantalum body 110. The tantalum wire 120 may be mounted by inserting it into a mixture of the tantalum powder and the binder so as to be eccentric from the center before compressing the powder mixed with the tantalum powder and the binder. That is, the tantalum body 110 may be manufactured by inserting a tantalum wire 120 into a tantalum powder mixed with a binder to form a tantalum element having a desired size, and then by sintering the tantalum element in a high-temperature and high-vacuum ($10^{-5}$ torr or less) atmosphere for about 30 minutes.

Figure 6:
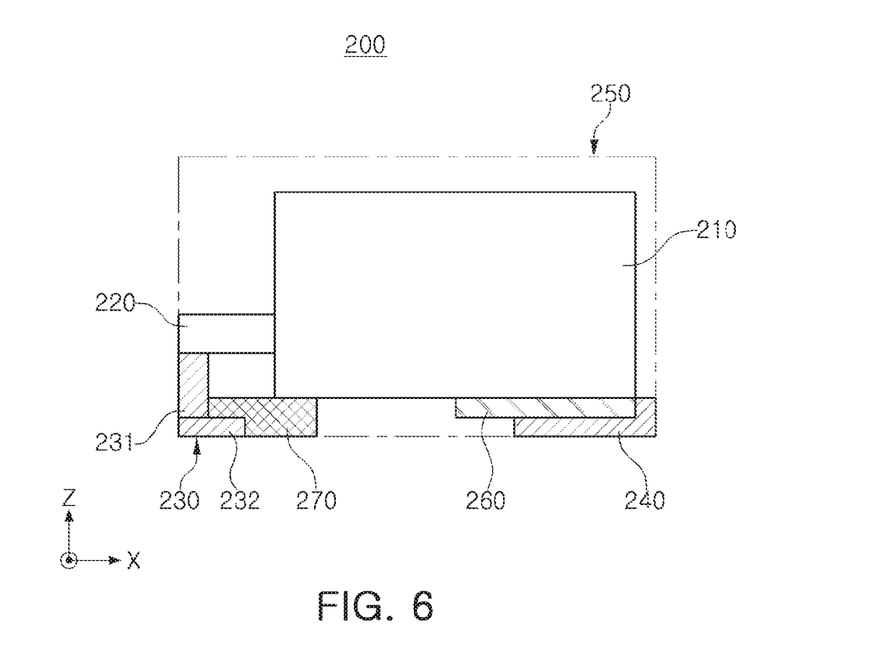
FIG. 6 is a side view of a tantalum capacitor according to another exemplary embodiment of the present disclosure.

In an exemplary embodiment of the present disclosure, an insulating layer 270 may be disposed between a tantalum body 210 and an anode lead frame 230 of a tantalum capacitor 200. FIG. 6 is a side view of the tantalum capacitor 200 according to another exemplary embodiment of the present disclosure. Referring to FIG. 6, an insulating layer 270 may be disposed in a space between the anode lead frame 230, including the anode connection member 231 and the anode terminal 232, and the tantalum body 210. The insulating layer 270 is not particularly limited as long as it has sufficient insulating properties. For example, a polymer resin, ceramic, or the like may be exemplified, but is not limited thereto. When an insulating layer 270 is disposed between the tantalum body 210 and the anode lead frame 230, in the manufacturing process of the tantalum capacitor 200 of the present disclosure, even if some parts deviate from a desired position, defects such as shorts, or the like, can be prevented.

In one exemplary embodiment of the present disclosure, the insulating layer 270 may be in contact with a bottom surface of the tantalum body 210 facing the second surface S2 of a molded portion 250, and in contact with the anode connection member 231 and the anode terminal 232 of the anode lead frame 230. In one exemplary embodiment, a maximum thickness of the insulating layer 270 in the T direction may be consistent with a shortest distance from the bottom surface of the tantalum body 210 to the second surface S2 of molded portion 250.

In the above-described embodiment, a distance between the tantalum body 210, on which the insulating layer 270 is disposed, and the anode lead frame in the X direction may be 0.10 mm or more.

Referring to FIG. 4, a distance (x) between the tantalum body 110 and the anode lead frame 130 may mean a shortest vertical distance between the tantalum body 110 and the anode connection member 131 in the X direction. The distance (x) between the tantalum body 110 and the anode lead frame 130 may be 0.10 mm or more, 0.11 mm or more, 0.12 mm or more, 0.13 mm or more, 0.14 mm or more, or 0.15 mm or more, and an upper limit thereof is particularly limited, but may be, for example, 2 mm or less. When the distance (x) between the tantalum body 110 and the anode lead frame 130 satisfies the above-described range, short occurrence can be effectively suppressed.

In another exemplary embodiment of the present disclosure, a conductive adhesive layer 260 (or 160 in FIGS. 3 and 4) may be disposed between the tantalum body 210 and the cathode lead frame 240 of the tantalum capacitor 200. The conductive adhesive layer 260 may be formed by applying and curing a predetermined amount of a conductive adhesive containing an epoxy-based thermosetting resin and a conductive metal powder such as silver (Ag), but the present disclosure is not limited thereto. When the conductive adhesive layer 260 is applied to the tantalum capacitor 200 of the present disclosure, fixing strength of the cathode lead frame 240 can be improved.

The tantalum capacitor 100 according to the present disclosure may be surrounded by a molded portion 150. The molded portion 150 may be formed by transfer molding a resin such as an epoxy molding compound (EMC) to surround the tantalum body 110. The molded portion 150 may serve to protect the tantalum wire 120 and the tantalum body 110 from the outside, and may serve to insulate the tantalum body 110 and the anode lead frame 130 from each other.

In one example of the present disclosure, a ratio (v1/v2) of a volume (v1) of the tantalum body 110 to a volume (v2) of the molded portion 150 may be 43% or more. The volume (v2) of the molded portion 150 is a sum of both the anode lead frame 130 and the cathode lead frame 140 of the tantalum capacitor 100 according to the present disclosure, and may be substantially the volume of the tantalum capacitor 100. The ratio (v1/v2) of the volume (v1) of the tantalum body 110 to the volume (v2) of the molded portion 150 substantially represents a relative volume of the tantalum body 100 forming the capacitive portion, which shows that an effective capacity of the tantalum capacitor increases as the ratio (v1/v2) increases. The ratio (v1/v2) of the volume (v1) of the tantalum body 110 to the volume (v2) of the molded portion 150 may be 43% or more, 44% or more, 45% or more, 46% or more, 47% or more, or 48% or more, and an upper limit thereof is not particularly limited, but for example, may be 60% or less. The ratio (v1/v2) of the volume (v1) of the tantalum body 110 to the volume (v2) of the molded portion 150 is due to the structure unique to the present disclosure, which may be achieved by forming the tantalum wire shorter than a minimum required length.

In one example, the tantalum capacitor according to the present disclosure may have a distance between the tantalum body and the fifth surface of the molded portion may be 0.45 mm or less. Referring to FIG. 4, a distance (y) between the tantalum body 110 and the fifth surface S5 of the molded portion 150 may mean a shortest distance between the tantalum body 100 and the fifth surface S5 of the molded portion 150. The distance (y) between the tantalum body 110 and the fifth surface S5 of the molded portion 150 may be 0.45 mm or less, 0.44 mm or less, 0.43 mm or less, 0.42 mm or less, 0.41 mm or less, or 0.40 mm or less, and a lower limit thereof is not particularly limited, but may be, for example, 0.1 mm or more. When the distance (y) between the tantalum body 110 and the fifth surface S5 of the molded portion 150 satisfies the above-described range, the tantalum body 110 inside the molded portion 150 may be disposed as far as possible to maximize capacity.

The present disclosure also relates to a manufacturing method of a tantalum capacitor.

FIGS. 7A to 7E are views illustrating a manufacturing method of the tantalum capacitor 300 according to an exemplary embodiment of the present disclosure.

Referring to FIGS. 7A to 7E, the manufacturing method of the tantalum capacitor 300 includes operations of: mounting a tantalum capacitor 300, which includes a tantalum body 310 having a tantalum wire 320 exposed from one surface thereof, on the anode lead frame 330, which includes the anode terminal 332 and the anode connection member 331, and the cathode lead frame 340; and cutting the anode terminal 332, the anode connection member 331, and the tantalum wire 320.

In an exemplary embodiment of the present disclosure, the manufacturing method of the tantalum capacitor of the present disclosure may further include an operation of forming an anode lead frame and a cathode lead frame including an anode electrode terminal and an anode electrode connection member before the operation of mounting the tantalum capacitor.

In another exemplary embodiment of the present disclosure, the manufacturing method of the tantalum capacitor of the present disclosure may further include an operation of bonding the anode connection member and the tantalum wire after the operation of mounting the tantalum capacitor.

Hereinafter, a method of manufacturing a tantalum capacitor according to the present invention will be described in detail with reference to FIGS. 7A to 7E.

Figure 7A:
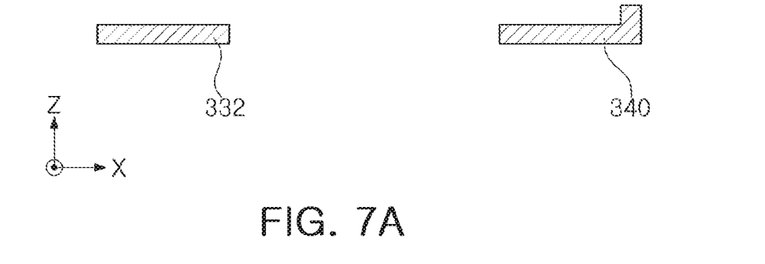
FIGS. 7A to 7E are schematic views illustrating operations of manufacturing a tantalum capacitor according to an exemplary embodiment of the present disclosure.
Figure 7B:
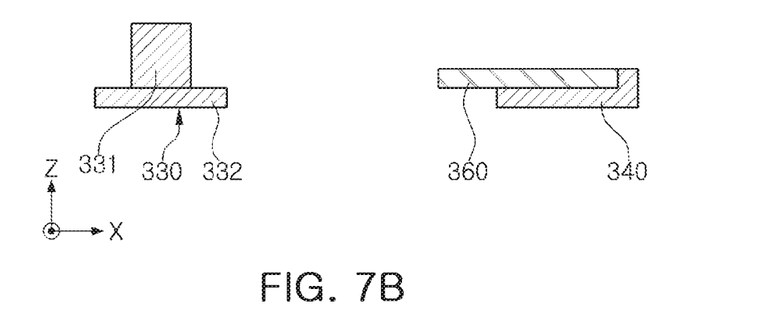

FIGS. 7A and 7B illustrate operations of forming the anode lead frame 330 and the cathode lead frame 340. The manufacturing method of the tantalum capacitor 300 according to the present disclosure may include an operation of forming an anode lead frame 330 by combining the anode terminal 332 and the anode connection member 331. In this case, a conductive adhesive layer 360 may be formed on the cathode lead frame 340 as necessary. In the present embodiment, a method of separately manufacturing and then combining the anode connection member 331 and the anode terminal 332 is used, but this is not essential, for example, the anode connection member 331 and the anode terminal 332 may be manufactured integrally. In addition, for curing the conductive adhesive layer 360, a process of curing at a temperature of about 100 to 200° C. may also be performed thereafter. The anode connection member 331, the anode terminal 332, and the cathode lead frame 340 may be manufactured using a conductive metal such as a nickel/iron alloy, or the like, but are not limited thereto.

Figure 7C:
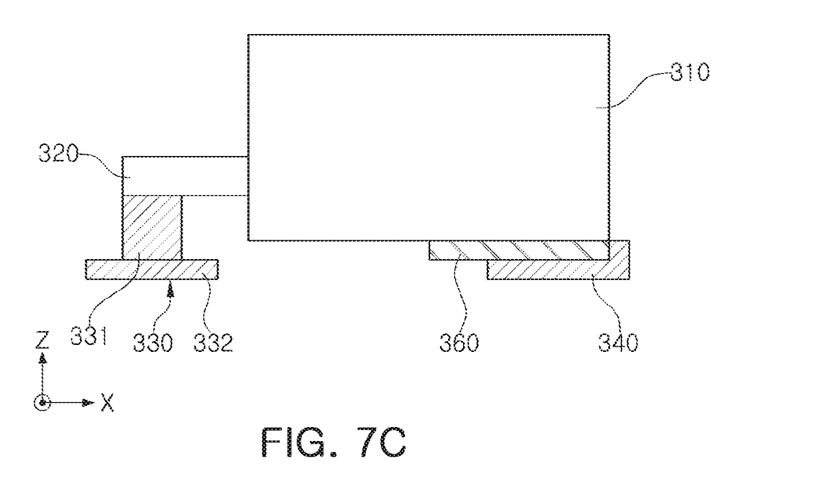

When the anode lead frame 330 and the cathode lead frame 340 are prepared, as shown in FIG. 7C, the tantalum capacitor 300 in which the tantalum wire 320 is disposed on one surface thereof may be mounted on the upper surfaces of the anode lead frame 330 and the cathode lead frame 340. In this case, the anode lead frame 330 and the cathode lead frame 340 may be horizontally disposed to face each other. In addition, heat-resistant tapes may be attached to the lower surfaces of the anode lead frame 330 and the cathode lead frame 340 to be connected to each other. The heat-resistant tape is to prevent contamination of the surfaces of the anode lead frame 330 and the cathode lead frame 340 in a subsequent molding process.

Next, the anode connection member 331 and the tantalum wire 320 are bonded. In this case, the tantalum wire 320 and the anode connection member 331 may be bonded, while the tantalum wire 320 contacts the anode connection member 331 of the anode lead frame 330. A bonding method is not particularly limited, and may be attached by, for example, spot welding or laser welding or applying a conductive adhesive.

Figure 7D:
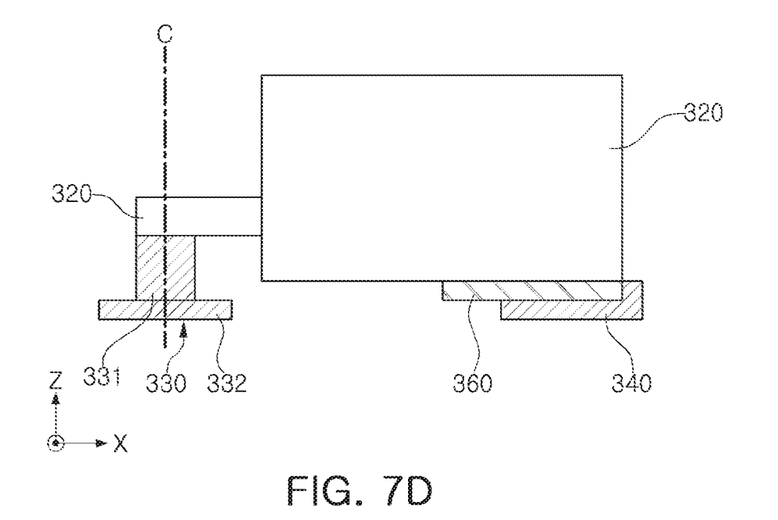

When the anode connection member 331 and the tantalum wire 320 are bonded, the tantalum wire 320, the anode connection member 331, and the anode terminal 332 are cut together. FIG. 7D is a view showing the cutting operation. Referring to FIG. 7D, after a cutting mask, a cutting line, or the like is disposed on the tantalum wire 320 connected to the anode connection member 331, cutting is performed using a blade, a dicing saw, a laser cutter, or the like, or using a method of cutting by inputting coordinates to be cut into a cutting device. A cutting position can be appropriately adjusted according to the capacity and size of the desired chip.

Figure 7E:
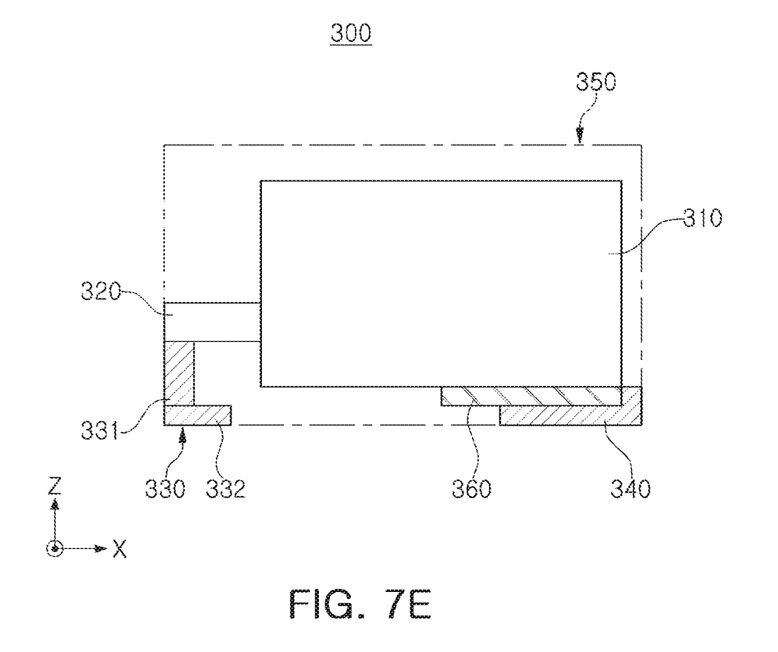

Next, as shown in FIG. 7E, a molded portion 250 is formed to surround the tantalum body 310 and the tantalum wire 320, and such that one surface of the anode lead frame 330 and the cathode lead frame 340 is exposed externally. The molded portion 250 serves to protect the tantalum wire 320 and the tantalum body 310 from the outside.

When the molded portion 250 is formed, a heat-resistant tape attached to the lower surfaces of the anode lead frame 330 and the cathode lead frame 340 is removed.

Through the above-described process, it is possible to manufacture a tantalum capacitor 300 according to an exemplary embodiment of the present disclosure.

Table 1 below compares a tantalum capacitor according to an exemplary embodiment of the present disclosure and a tantalum capacitor manufactured by the conventional method.

TABLE 1

| [Unit of volume: mm³] | Comparative Example | Example |
|---|---|---|
| Volume of a tantalum body | 1.28 | 1.51 |
| Increase rate of a volume of a tantalum body | — | 17.6% |
| Volume of a molded portion | 2.98 | 2.98 |
| v1/v2 | 42% | 50% |

In Table 1 above, in Comparative Example, a tantalum capacitor having a 2012 size is used, and v1/v2 shows a ratio (v1/v2) of the volume (v1) of a tantalum body to the volume (v2) of a molded portion in which the tantalum body is embedded. In addition, in the case of the Example, the molded portion was prepared using the same material as the Comparative Example, except that 0.2 mm thereof was cut from an end portion of the tantalum wire so that a length of the anode connection member in the X direction was 0.15 mm.

Referring to Table 1, it can be seen that a volume of a tantalum body significantly increases although the volume of an entire chip does not increase, and thus, it can be seen that a volume (v1/v2) substantially occupied by a capacitance portion is improved.

Figure 8:
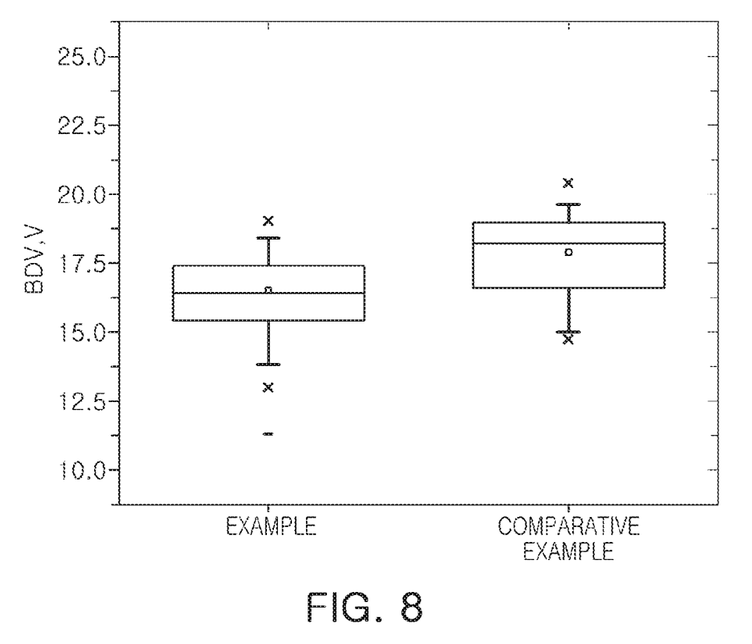
FIG. 8 is a graph showing differences between Examples and Comparative Examples of the present disclosure.

FIG. 8 shows that a breakdown voltage (BDV) of the above-described Examples and Comparative Examples. The breakdown voltage (BDV) was measured using a measuring device (manufactured by HP, a 4156B Precision Semiconductor Parameter Analyzer) under the condition of 100 mA compliance [0.2V/s]. Referring to FIG. 8, it can be seen that unlike in the Comparative Example, in the Example, excellent breakdown voltage (BDV) characteristics are exhibited.

As set forth above, according to an exemplary embodiment of the present disclosure, it is possible to provide a high-capacity tantalum capacitor by increasing an effective volume of the tantalum body.

According to another exemplary embodiment of the present disclosure, it is possible to provide a tantalum capacitor having excellent mechanical reliability by increasing adhesion of anode and cathode lead frames.

According to another exemplary embodiment of the present disclosure, a withstand voltage and a breakdown voltage of the tantalum capacitor may be increased by increasing a volume of the tantalum body.

According to another exemplary embodiment of the present disclosure, ESR of the tantalum capacitor can be reduced by reducing an electrical signal length.

However, various and advantageous advantages and effects of the present invention are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor, comprising:
   a tantalum body having a tantalum wire exposed from one surface of the tantalum body;
   a molded portion including first and second surfaces opposing each other in a thickness direction, third and fourth surfaces opposing each other in a width direction, and fifth and sixth surfaces opposing each other in a longitudinal direction, the molded portion surrounding the tantalum body;
   an anode lead frame including an anode connection member and an anode terminal, which are connected to the tantalum wire, exposed through the second surface of the molded portion; and
   a cathode lead frame spaced apart from the anode lead frame, and exposed through the second surface of the molded portion,
   wherein end portions of the tantalum wire, the anode connection member, and the anode terminal in the longitudinal direction are on a same plane,
   wherein an insulating layer, which is different from the molded portion, is disposed between the tantalum body and the anode lead frame, and
   wherein the insulating layer is exposed to the second surface of the molded portion and spaced apart from the cathode lead frame.

2. The tantalum capacitor of claim 1, wherein the end portions of the tantalum wire, the anode connection member, and the anode terminal in the longitudinal direction include a cut surface.

3. The tantalum capacitor of claim 1, wherein a length of the anode connection member in the longitudinal direction is 0.2 mm or less.

4. The tantalum capacitor of claim 1, wherein the anode connection member has a square columnar shape.

5. The tantalum capacitor of claim 1, wherein the anode connection member has a cylindrical shape.

6. The tantalum capacitor of claim 1, wherein the tantalum wire and the anode connection member include a welded joint.

7. The tantalum capacitor of claim 1, wherein the insulating layer is in contact with a bottom surface of the tantalum body facing the second surface of the molded portion, and in contact with the anode connection member and the anode terminal.

8. The tantalum capacitor of claim 7, wherein a maximum thickness of the insulating layer in the thickness direction is consistent with a shortest distance from the bottom surface of the tantalum body to the second surface of molded portion.

9. The tantalum capacitor of claim 1, wherein a conductive adhesive layer is disposed between the tantalum body and the cathode lead frame.

10. The tantalum capacitor of claim 1, wherein a ratio (v1/v2) is 43% or more, where 'v1' refers to a volume of the tantalum body and 'v2' refers to a volume of the molded portion.

11. The tantalum capacitor of claim 1, wherein a distance between the tantalum body and the fifth surface of the molded portion is 0.45 mm or less.

12. A manufacturing method of a tantalum capacitor, comprising operations of:
mounting a tantalum capacitor, which includes a tantalum body having a tantalum wire exposed from one surface thereof, on an anode lead frame, which includes an anode terminal and an anode connection member, and a cathode lead frame;
cutting the anode terminal, the anode connection member, and the tantalum wire; and
disposing an insulating layer between the tantalum body and the anode lead frame and forming a molded portion which is different from the insulating layer,
wherein the insulating layer is exposed to one surface of the molded portion and spaced apart from the cathode lead frame.

13. The manufacturing method of the tantalum capacitor of claim 12, further comprising an operation of forming the anode lead frame, which includes the anode terminal and the anode connection member, and the cathode lead frame before the operation of mounting a tantalum capacitor.

14. The manufacturing method of the tantalum capacitor of claim 12, further comprising an operation of bonding the anode connection member and the tantalum wire after the operation of mounting a tantalum capacitor.

15. A tantalum capacitor, comprising:
a tantalum body having a tantalum wire exposed from one surface of the tantalum body;
a molded portion including first and second surfaces opposing each other in a thickness direction, third and fourth surfaces opposing each other in a width direction, and fifth and sixth surfaces opposing each other in a longitudinal direction, the molded portion surrounding the tantalum body;
an anode lead frame including an anode connection member and an anode terminal, which are connected to the tantalum wire, exposed through the second surface of the molded portion; and
a cathode lead frame spaced apart from the anode lead frame, and exposed through the second surface of the molded portion,
wherein the tantalum wire, the anode connection member, and the anode terminal are exposed to an outside of the tantalum capacitor through the fifth surface of the tantalum body in the longitudinal direction, and
wherein an insulating layer, which is different from the molded portion, is disposed between the tantalum body and the anode lead frame, and
wherein the insulating layer is exposed to the second surface of the molded portion and spaced apart from the cathode lead frame.

16. The tantalum capacitor of claim 15, wherein end portions of the tantalum wire, the anode connection member, and the anode terminal in the longitudinal direction are on a same plane.

17. The tantalum capacitor of claim 15, wherein a conductive adhesive layer is disposed between the tantalum body and the cathode lead frame.

18. The tantalum capacitor of claim 15, wherein a ratio (v1/v2) is 43% or more, where 'v1' refers to a volume of the tantalum body and 'v2' refers to a volume of the molded portion.

* * * * *